United States Patent [19]

MacDonald

[11] 4,286,701

[45] Sep. 1, 1981

[54] AMPLIFYING CLUTCH

[75] Inventor: J. G. Fraser MacDonald, Detroit, Mich.

[73] Assignee: Warner Electric Brake & Clutch Company, South Beloit, Ill.

[21] Appl. No.: 107,038

[22] Filed: Dec. 26, 1979

Related U.S. Application Data

[63] Continuation-in-part of Ser. No. 946,441, Sep. 27, 1978, abandoned.

[51] Int. Cl.[3] ...................... F16D 13/02; F16D 15/00; F16D 67/02

[52] U.S. Cl. .................................... 192/18 R; 192/35; 192/48.3; 192/93 A

[58] Field of Search ................. 192/18 R, 18 A, 18 B, 192/35, 36, 48.3, 54, 93 A

[56] References Cited

U.S. PATENT DOCUMENTS

| | | | |
|---|---|---|---|
| 2,812,047 | 11/1957 | Smitzer | 192/18 R |
| 2,816,636 | 12/1957 | Weibel, Jr. | 192/35 |
| 2,985,992 | 5/1961 | Dowdle | 192/18 R X |
| 3,000,479 | 9/1961 | Mosbacher | 192/35 |
| 3,744,609 | 7/1973 | Miller | 192/35 X |
| 3,915,268 | 10/1975 | MacDonald | 192/12 BA |
| 3,978,947 | 9/1976 | Modersohn | 192/12 BA |

*Primary Examiner*—Allan D. Herrmann

*Attorney, Agent, or Firm*—Leydig, Voit, Osann, Mayer & Holt, Ltd.

[57] ABSTRACT

Torque is transmitted from the input member of a clutch to a primary shoe when the primary shoe is pressed into frictional engagement with the input member by compression springs. When initially turned by the input member, the primary shoe moves a series of balls angularly along inclined ramps to cause a secondary shoe to shift into frictional engagement with the input member and transmit torque to the output member of the clutch. A brake acts through the shoes to retard the output member when the clutch is disengaged.

10 Claims, 5 Drawing Figures

11
15
20
21
16
18
22
52
50
62
53
53
51
62
62
53
37
38
32
63
63
55
36
63
44
60
60
45
27
61
54
61
31
31
45
54
45
61

AMPLIFYING CLUTCH

CROSS-REFERENCES TO A RELATED APPLICATION

This application is a continuation-in-part of my application Ser. No. 946,441, filed Sept. 27, 1978, and now abandoned.

BACKGROUND OF THE INVENTION

This invention relates to a clutch of the type in which an input member and an output member are coupled to rotate in unison when a friction shoe which is rotatable with one of the members is moved into frictional engagement with the other of the members. A clutch of this general type is disclosed in Modersohn United States application Ser. No. 753,417, filed Dec. 22, 1976 and assigned to the assignee of the present invention.

SUMMARY OF THE INVENTION

The general aim of the present invention is to provide a new and improved clutch of the foregoing type in which the friction shoe may be engaged with a relatively low force and in which the force acting on the friction shoe is amplified in a unique manner to enable the clutch to possess relatively high torque capacity, the amplification being produced without creating a self-energizing or self-servo action so as to permit the clutch to engage smoothly and with low shock.

A more detailed object is to achieve the foregoing through the provision of a clutch in which a secondary friction shoe is engaged smoothly and automatically following initial engagement of the primary shoe and coacts with the primary shoe in such a manner that torque is transmitted from the input member to the output member without either shoe self-energizing.

A further object is to provide a relatively compact clutch by arranging the two friction shoes in concentric relationship with one another.

Still another object of the invention is to provide an amplifying clutch of the foregoing type with a brake which retards the output member when the clutch is disengaged.

The invention also resides in the provision of balls and ball ramps which are uniquely located between the secondary shoe and the output member and which serve to engage the secondary shoe without reacting against the primary shoe and causing that shoe to self-energize.

These and other objects and advantages of the invention will become more apparent from the following detailed description when taken in conjunction with the accompanying drawings.

DETAILED DESCRIPTION OF THE PREFERRED EMBODIMENT

Figures 1, 2, 3, 4:
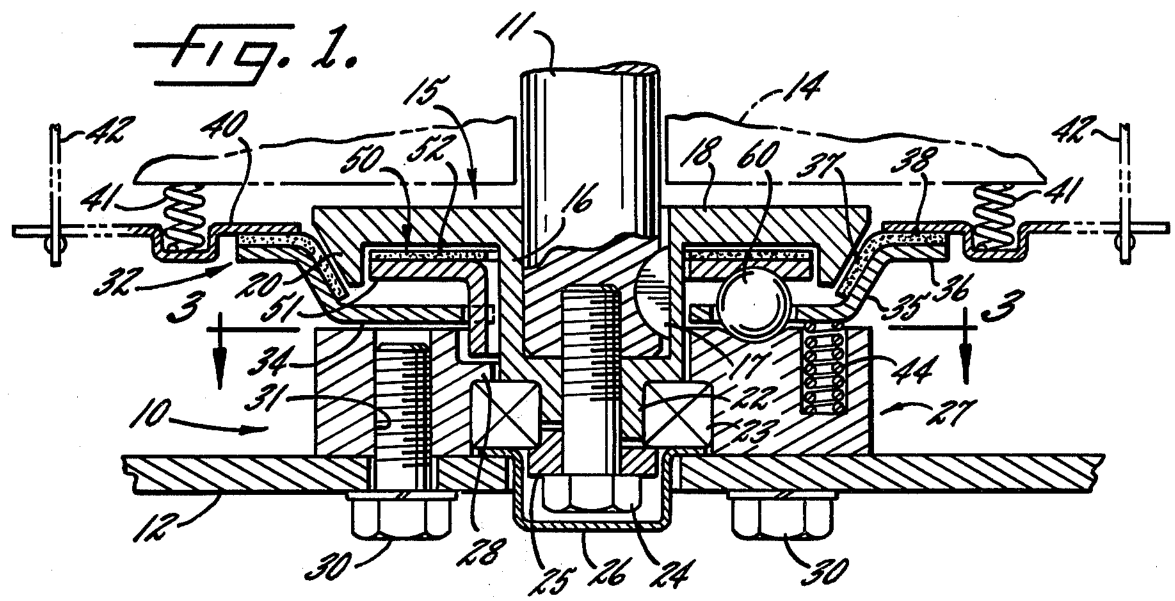
FIG. 1 is a fragmentary vertical sectional view of a new and improved clutch incorporating the unique features of the present invention, the clutch being in a disengaged condition and being shown as taken substantially along the line 1—1 of FIG. 3.
FIG. 2 is a view similar to FIG. 1 but shows the clutch in an engaged condition.
FIG. 3 is a cross-sectional view taken along the line 3—3 of FIG. 1.
FIG. 4 is an enlarged cross-sectional view of one of the ball ramps as taken substantially along the line 4—4 of FIG. 3.

As shown in the drawings for purposes of illustration, the invention is embodied in a clutch 10 for selectively coupling a rotatable driving element 11 to a rotatable driven element 12. In the present instance, the driving element 11 is the shaft of a motor or engine (not shown) while the driven element 12 is the rotary blade of a lawnmower. The shaft 11 extends through the deck 14 of the mower with the blade 12 being located below the deck. The shaft rotates in a clockwise direction as viewed in FIG. 3.

Figure 5:
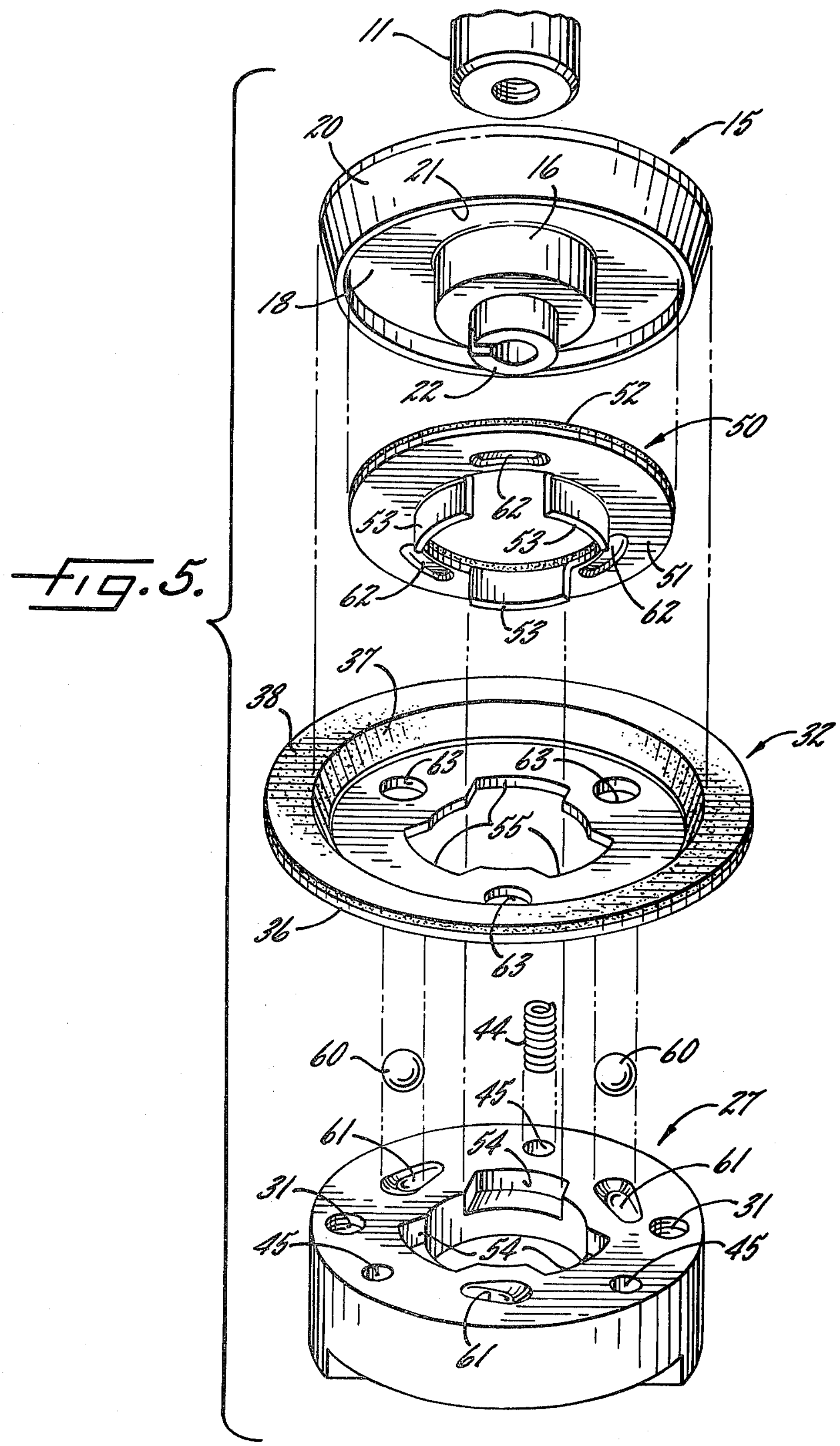
FIG. 5 is an exploded perspective view of certain parts of the clutch.

The clutch 10 comprises an input member 15 having a tubular sleeve 16 which is keyed to the driving shaft 11 at 17. A plate 18 extends radially from the upper end of the sleeve and preferably terminates at its periphery in a depending flange 20 whose outer surface is tapered inwardly and downwardly and thus is conical in shape. An annular recess 21 (FIG. 5) is defined by the inner side of the flange 20, the lower side of the plate 18 and the outer side of the upper end portion of the sleeve 16.

At its lower end, the sleeve 16 of the input member 15 is formed with a reduced diameter hub 22 which supports a ball bearing 23. The bearing is held in place by a screw 24 which projects through a key-type collar 25 and the hub 22 and which is threaded into the lower end of the shaft 11, the bearing thereby being clamped between the collar and the lower end of the sleeve 16. A flange cup 26 covers the screw 24 and the collar 25 and, as will appear later, is clamped against the lower end of the bearing to protect the bearing from dirt and the like.

The clutch 10 further comprises an annular output member 27 which is journaled on the bearing 23 for selective rotation relative to the shaft 11, the output member being formed with an upper flange 28 which captivates the output member against downward movement relative to the bearing. Screws 30 extend through the blade 12 and are threaded into holes 31 (FIG. 3) in the output member to cause the blade to rotate with the output member and, at the same time, to hold the cup 26 in place between the blade and the bearing 23.

To couple the output member 27 for rotation with the input member 15, the clutch 10 includes an annular shoe 32 (FIG. 5) having a central disc 34 located between the input and output members, having a wall 35 (FIG. 1) which flares upwardly and outwardly from the disc and having a flange 36 projecting radially from the upper margin of the wall. A layer of suitable friction material 37 is bonded to the inner side of the wall 35 while a similar layer 38 of friction material is bonded to the upper side of the flange 36, the friction material 37 and 38 being formed from a single piece of material. The friction material 37 on the wall 35 is conical in shape and is complementary with the outer side of the flange 20 of the input member 15.

When the clutch 10 is in a disengaged condition as shown in FIG. 1, the friction material 37 of the shoe 32 is held out of effective contact with the flange 20 of the input member 15 by a manually operable element in the form of an actuator ring 40 which is suitably supported for up and down movement beneath the deck 14 of the mower. The actuator ring 40 is urged downwardly by a series of angularly spaced coil springs 41 which are compressed between the ring and the deck 14. The springs normally hold the ring 40 in engagement with the friction material 38 on the flange 36 and normally hold the friction material 37 on the wall 35 out of engagement with the flange 20 of the input member 15. Cables 42 or the like are connected between the ring and a suitable part such as an operating lever (not shown) on the handle of the mower. When the operating lever is actuated manually to pull on the cables, the ring 40 is lifted away from the friction material 38 (see FIG. 2).

As an incident to lifting of the actuator ring 40, the friction material 37 on the shoe 32 is moved into frictional contact with the flange 20 of the input member 15 to cause the clutch 10 to engage. For this purpose, three angularly spaced coil springs 44 are telescoped into holes 45 (FIG. 5) in the upper side of the output member 27 and are compressed against the lower side of the disc 34 of the shoe 32. The combined force of the springs 44 is less than the combined force of the springs 41 and thus the springs 41 normally are effective to overcome the springs 44 and hold the friction material 37 on the shoe 32 downwardly away from the flange 20 of the input member 15 as long as the operating lever is released and the cables 42 are loose (see FIG. 1). When the operating lever is manually moved to and held in an actuated position, the ring 40 is lifted away from the shoe 32 to permit the springs 44 to press the friction material 37 upwardly into engagement with the flange 20 of the input member 15 and to cause the shoe 32 to turn with the input member (see FIG. 2). Because of the conical surfaces of the flange 20 and the friction material 37, the springs 44 press the friction material against the flange with a wedging action.

In accordance with the present invention, the clutch 10 is provided with a secondary shoe 50 (FIG. 5) which is automatically forced into frictional engagement with the input member 15 once the primary shoe 32 begins turning with the input member. The secondary shoe 50 coacts with the primary shoe 32 to amplify the force of the springs 44 and to transmit torque from the input member 15 to the output member 27. By virtue of the amplification, the overall torque capacity of the clutch is high in relation to the force exerted by the springs 44. Importantly, however, the amplification is achieved without creating any self-energizing or self-servo action within the clutch and thus the clutch engages smoothly and operates with predictable friction characteristics.

More specifically, the secondary shoe 50 comprises an annular plate 51 located above the disc 34 of the primary shoe 32 and disposed within the recess 21 in the underside of the input member 15. A layer of friction material 52 is bonded to the upper side of the plate 51 of the secondary shoe 50 and is adapted to frictionally contact the lower side of the plate 18 of the input member 15 when the clutch 10 is engaged (see FIG. 2).

Formed integrally with and depending from the plate 51 of the secondary shoe 50 are three angularly spaced jaws 53 (FIGS. 3 and 5) which fit tightly but slidably into three angularly spaced notches 54 formed in the upper side of the output member 27. The jaws and the notches function as a spline in that they couple the secondary shoe 50 and the output member 27 for rotation in unison but permit the secondary shoe to slide axially relative to the output member. There is little if any circumferential clearance between the jaws and the notches and thus, for all practical purposes, the secondary shoe 50 is not capable of rotating relative to the output member 27.

The jaws 50 also are received loosely within three notches 55 (FIG. 5) formed in the disc 34 of the primary shoe 32 and serve as a slidable pilot for the primary shoe. There is, however, circumferential clearance between the jaws and the notches 55 in the primary shoe and thus the primary shoe is capable of moving angularly through a limited distance relative to the secondary shoe 50 and the output member 27.

In carrying out the invention, means are provided between the output member 27 and the secondary shoe 50 for shifting the secondary shoe axially into engagement with the input member 15 in response to the primary shoe initially being turned by the input member, such means acting without causing the clutch 10 to self-energize or self-servo. Herein, these means comprise three angularly spaced balls 60 which are captivated between lower races 61 (FIGS. 3 to 5) formed in the upper side of the output member 27 and upper races 62 (FIG. 5) formed in the lower side of the plate 51 of the secondary shoe 50. The balls are retained with a relatively close but axially movable fit within angularly spaced holes 63 formed through the disc 34 of the primary shoe 32 and thus the disc constitutes a cage for the balls.

The lower races 61 in the output member 27 are of generally tear drop shape and are ramped such that the bottom of each race slopes upwardly upon progressing circumferentially in the direction of rotation (see FIG. 4). In other words, the races decrease in depth in the direction of rotation. In the present instance, the upper races 62 are not ramped but instead are of substantially constant depth throughout their length, the races 62 being arcuate in shape. The balls 60 normally are located in the deepest portions of the races 61 as shown in FIG. 4 and, when the balls are so located, the friction material 52 on the secondary shoe 50 is spaced downwardly from the plate 18 of input member 15 (see FIG. 1).

When the actuator ring 40 is lifted to engage the clutch 10, the springs 44 force the primary shoe 32 upwardly from the position shown in FIG. 1 to the position shown in FIG. 2 and press the coned friction material 37 on the primary shoe against the coned flange 20 of the input member 15. The primary shoe 32 thus starts turning with the input member and turns relative to the jaws 53 of the secondary shoe 50. When the primary shoe 32 turns, it shifts the balls 60 angularly in the races 61 and 62 and causes the balls to move up the ramps of the lower races 61 from the position shown in FIG. 4. Movement of the balls up the ramps produces two effects. First, the balls shift the secondary shoe 50 upwardly and cause the friction material 52 thereon to engage the plate 18 of the input member 15. The secondary shoe 50 thus turns with the input member so that torque is transmitted to the output member 27 by way of the jaws 53. Secondly, the balls wedge circumferentially between the races 61 and 62 and, since the balls are captivated circumferentially in the holes 63 in the primary shoe 32, the balls serve to couple the primary shoe to the output member 27. Accordingly, torque is transmitted from the primary shoe to the output member by way of the balls.

Importantly, the clutch 10 engages without self-energizing or producing a self-servo action. In other words, the normal force created between the primary shoe 32 and the input member 15 and the normal force created between the secondary shoe 50 and the input member 15 remain the same regardless of whether the output member 27 is subjected to no load or whether the output member is subjected to a very high load. Self-energization is prevented by virtue of the fact that the balls 60 merely float axially in the holes 63 in the primary shoe 32 and do not exert any axial reaction force on the primary shoe when the balls move up the ramps of the lower races 61. Thus, the force exerted by the primary shoe 32 against the input member 15 is determined by the force of the springs 44 and is not affected by the degree of ramping of the balls 60. Also, angular shifting of the balls is effected by the primary shoe 32 itself and, since the output member 27 and the secondary shoe 50 are constrained to rotate in unison, the axial force exerted by the balls against the secondary shoe does not increase when the torque load on the output member increases. Accordingly, the clutch 10 engages softly, smoothly and without shock or self-locking and provides a substantially linear change in torque with a change in friction.

When the operating lever is actuated to cause the springs 41 to depress the ring 40, the primary shoe 32 is forced downwardly away from the input member 15 to interrupt the transmission of driving torque by way of the primary shoe. In addition, the ring 40 applies a braking torque to the friction material 38 on the primary shoe and causes the latter to turn reversely through a limited distance relative to the output member 27. As a result, the balls are shifted reversely or downwardly along the ramps of the races 61 and allow the secondary shoe 50 to move downwardly out of engagement with the input member 15 so as to interrupt the transmission of driving torque via the secondary shoe. The braking torque applied to the primary shoe 32 by the ring 40 is transmitted from the primary shoe to the jaws 53 of the secondary shoe 50 and thence from the jaws to the output member 27 so as to bring the latter to a stop. Accordingly, a braking torque is applied to the output member 27 upon interruption of the driving torque.

From the foregoing, it will be apparent that the present invention brings to the art a new and improved clutch 10 in which the force applied to the primary shoe 32 by the springs 44 is amplified by the balls 60 to effect the transmission of torque to the output member 27 by way of the secondary shoe 50. By virtue of this arrangement, only relatively light springs 44 are required for a clutch of relatively high torque capacity and thus the springs 41 also can be of reduced strength so as to decrease the manual effort required to keep the operating lever in an actuated condition.

The shoes 32 and 50 are concentric with one another and thus the clutch 10 is relatively compact. Those of ordinary skill in the art will appreciate that different forms of shoes could be used in lieu of the shoe 32 being a cone and the shoe 50 being a plate. For example, both shoes could be plates, both could be cones or the shoe 32 could be a plate and the shoe 50 could be a cone. When the primary shoe 32 is in the form of a plate, the clutch lends itself to electromagnetic actuation in place of the springs 44. Those familiar with the art also will appreciate that various forms of ramps, levers or rockers could be used in place of the balls 60.

I claim:

1. A clutch comprising rotatably mounted input and output members, a rotatably mounted first shoe supported to move axially relative to said input member and to turn angularly through a limited distance relative to said output member, coacting friction surfaces on said input member and said first shoe, said friction surfaces engaging one another and causing said first shoe to turn with said input member when said first shoe is moved axially toward said input member, said friction surfaces effectively releasing one another and enabling said input member to turn relative to said first shoe when said first shoe is moved axially away from said input member, selectively operable means for causing said first shoe to move axially toward and away from said input member, a rotatably mounted second shoe supported to move axially relative to said input and output members and coupled to rotate substantially in unison with said output member, coacting friction surfaces on said input member and said second shoe, said latter friction surfaces engaging one another and causing said second shoe to be turned by said input member when said second shoe is moved axially toward said input member, said latter friction surfaces effectively releasing one another and enabling said input member to turn relative to said second shoe when said second shoe is moved axially away from said input member, said clutch being characterized by means located between and engageable with said second shoe and said output member and coupled to said first shoe so as to be moved angularly through a limited distance by said first shoe and relative to said second shoe and said output member when said first shoe is initially turned by said input member, said last-mentioned means being effective upon being moved angularly through said distance to force said second shoe axially toward said input member without producing an axial reaction force against said first shoe.

2. A clutch as defined in claim 1 in which said last-mentioned means comprise a series of angularly spaced balls, a first set of angularly spaced races formed in said output member and receiving said balls, a second set of angularly spaced races formed in said second shoe and also receiving said balls, the length of said races being greater than the diameter of said balls to enable the balls to travel angularly in the races, the races of one of said sets being ramped to cause said balls to force said second shoe toward said input member as said balls travel angularly in one direction in said races, said first shoe having a cage located between said output member and said second shoe, and said cage having means for captivating said balls to turn with said first shoe and for causing said balls to travel angularly in said one direction in said races when said first shoe is initially turned by said input member.

3. A clutch as defined in claim 2 in which said captivating means comprise a series of angularly spaced holes formed in said cage and receiving said balls with clearance permitting said balls to move axially in said holes.

4. A clutch as defined in claim 1 further including jaws on said second shoe and projecting into notches in said output member with a tight fit to couple said second shoe and said output member for rotation in unison while permitting axial sliding of said second shoe relative to said output member, said jaws projecting into notches in said first shoe with a loose fit to permit limited rotation of said first shoe relative to said second shoe.

5. A clutch as defined in claim 1 in which one pair of coacting friction surfaces is defined by mating conical surfaces.

6. A clutch as defined in claim 1 in which one pair of coacting friction surfaces is defined by mating planar surfaces.

7. A clutch as defined in claim 1 in which one pair of coacting friction surfaces is defined by mating conical surfaces, the other pair of coacting friction surfaces being defined by mating planar surfaces.

8. A clutch as defined in claim 7 in which the mating conical surfaces define the coacting friction surfaces on said input member and said first shoe while the mating planar surfaces define the coacting friction surfaces on said input member and said second shoe.

9. A clutch as defined in claim 1 in which said selectively operable means include a series of springs which urge said first shoe axially toward said input member, said selectively operable means further including an element urged to a normal position in engagement with said first shoe and movable manually to an actuated position out of engagement with said first shoe, said element overcoming the force of said springs and holding the friction surface of said first shoe out of effective engagement with the coacting friction surface of said input member when said element is in said normal position.

10. A clutch as defined in claim 9 further including coacting friction surfaces on said element and said first shoe and retarding rotation of said first shoe when said element is in said normal position.

* * * * *